US007741376B2

(12) United States Patent
Toki et al.

(10) Patent No.: US 7,741,376 B2
(45) Date of Patent: Jun. 22, 2010

(54) PROCESS FOR PREPARING DISPERSED INGREDIENT HAVING METAL-OXYGEN BONDS

(75) Inventors: Motoyuki Toki, Kyoto (JP); Akiji Higuchi, Kyoto (JP); Nobuo Kimura, Naka-gun (JP); Yoshitaka Fujita, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 6 days.

(21) Appl. No.: 12/332,620

(22) Filed: Dec. 11, 2008

(65) Prior Publication Data

US 2009/0143498 A1 Jun. 4, 2009

Related U.S. Application Data

(62) Division of application No. 10/483,451, filed as application No. PCT/JP02/07899 on Aug. 2, 2002, now abandoned.

(30) Foreign Application Priority Data

Aug. 3, 2001 (JP) .............................. 2001-236372

(51) Int. Cl.
*B01F 3/08* (2006.01)
(52) U.S. Cl. ............... 516/33; 106/287.18; 106/287.19; 106/287.34; 423/325; 423/592.1; 423/594.17; 423/606; 423/608; 423/622; 423/624
(58) Field of Classification Search .................. 516/33; 106/287.18, 287.19, 287.34; 423/325, 592.1, 423/594.17, 606, 608, 622, 624
See application file for complete search history.

(56) References Cited

U.S. PATENT DOCUMENTS

| 4,416,963 | A | | 11/1983 | Takimoto et al. |
| 5,234,556 | A | | 8/1993 | Oishi et al. |
| 5,908,585 | A | | 6/1999 | Shibuta |
| 6,074,791 | A | * | 6/2000 | Jennings et al. ............. 430/58.8 |
| 6,159,539 | A | | 12/2000 | Schwertfeger et al. |
| 6,235,260 | B1 | * | 5/2001 | Toki et al. ................. 423/594.9 |

FOREIGN PATENT DOCUMENTS

EP 0 413 564 B1 7/1994

(Continued)

OTHER PUBLICATIONS

STIC search, Mar. 5, 2010.*

(Continued)

*Primary Examiner*—Stanley Silverman
*Assistant Examiner*—Paul A Wartalowicz
(74) *Attorney, Agent, or Firm*—Oliff & Berridge, PLC

(57) ABSTRACT

A dispersed ingredient having metal-oxygen bonds which is obtained by hydrolyzing a metal alkoxide in an organic solvent in the absence of an acid, a base, and/or a dispersion stabilizer, either with 0.5 to less than 1 mol of water per mol of the metal alkoxide or at −20° C. or lower with 1.0 to less than 2.0 mol of water per mol of the metal alkoxide. In the organic solvent, the dispersed ingredient is stably dispersed without aggregating. Use of the dispersed ingredient enables a thin metal oxide film and a homogeneous organic/inorganic composite to be produced at a temperature as low as 200° C. or below.

6 Claims, 1 Drawing Sheet

FOREIGN PATENT DOCUMENTS

| JP | 01-230407 A | 9/1989 |
|---|---|---|
| JP | 3-212451 A | 9/1991 |
| JP | 08-157735 A | 6/1996 |
| JP | 10-298769 A | 11/1998 |
| JP | 11-014949 A | 1/1999 |
| JP | 11-310755 A | 11/1999 |

OTHER PUBLICATIONS

Milne, Steven J. et al., "Modified Sol-Gel Process for the Production of Lead Titanate Films" *J. Am. Ceram. Soc.*, vol. 14(6): pp. 1407-1410 (1991).

Ota, Rikuo et al., "Preparation and Some Properties of Organic-Inorganic Gels in the Tetraethylorthosilicate-Polyethylene Glycol System," Japan Ceramics Association, vol. 97(3): pp. 213-218 (1989).

Schroeder, H., "Oxide Layers Deposited from Organic Solutions," *Physics of Thin Films*, edited by G. Hass and R. E. Thun, Academic Press, vol. 5: pp. 87-141 (1969).

Takahashi, Yasutaka et al., "Dip Coating of Zirconia and Mixed Zirconia Films," *Yogyo-Kyokai-Shi*, vol. 95(1): pp. 942-948 (1987).

Tuchiya, Toshio et al., "Preparation of Ferroelectric $BaTiO_3$ Films by Sol-Gel Process and Dielectric Properties," *Journal of the Ceramic Society of Japan*, vol. 98(8): pp. 743-748 (1990).

Uchihashi, Hiroe et al., "Preparation of Amorphous $Al_2O_3$ Thin Films from Stabilized Al-Alkoxides by the Sol-Gel Method," *Nippon Seramikkusu Kyokai Gakujutsu Ronbunshi*, vol. 97(3): pp. 396-399 (1989).

European Search Report for Application No: 02 755 781.8—2111, dated Jan. 3, 2007.

\* cited by examiner

US 7,741,376 B2

PROCESS FOR PREPARING DISPERSED INGREDIENT HAVING METAL-OXYGEN BONDS

This application is a divisional of U.S. application Ser. No. 10/483,451, filed Jan. 8, 2004, which claims priority to International Application PCT/JP02/07899 filed Aug. 2, 2002 which claims priority under 35 U.S.C. §119 to Japanese Patent Application No. 2001-236372, filed on Aug. 3, 2001. The contents of each of these applications are hereby incorporated by reference in their entirety.

FIELD OF INVENTION

The present invention relates to dispersed ingredients having metal-oxygen bonds, thin metal oxide films produced from the said ingredients, and organic-inorganic composites containing, as components, the said ingredients or inorganic polymers produced from the ingredients.

BACKGROUND ART

An organic-inorganic composite that an inorganic component is compounded in an organic polymer (which is sometimes called organic-inorganic hybrid or organic-inorganic composite polymer) has drawn attention as an industrial material with new properties that are both of the characters of the organic polymer and the inorganic component.

Particularly when an organic-inorganic composite is produced to be used for a plastic lens with a high refractive index, use of titanium oxide as the inorganic component is considered to be favorable.

An example of the organic-inorganic composite produced with a titanium oxide sol is disclosed in Japanese Patent Laid-open No. Hei 8-157735 which describes a process for the preparation of an organic-inorganic composite polymer, characterized by hydrolysis and dehydration condensation of a metal alkoxide with an acid or a base as a catalyst in the presence of an organic monomer, followed by polymerization of an organic-inorganic composite containing the obtained metal oxide and the organic monomer.

Japanese Patent Laid-open No. Hei 11-14949 describes a process for producing contact lenses by polymerization of a monomer mixture that contains Component A, a monomer composition containing at least a monomer and a metal oxide having optional organic groups and produced by hydrolysis and dehydration condensation of a metal alkoxide in the presence of the monomer, and Component B, a monomer capable of polyaddition or polycondensation with the monomer composition of Component A.

As processes for producing transparent, homogeneous metal oxide sols, for example, Japanese Patent Laid-open No. Hei 10-298769 describes a process for the preparation of a metal oxide precursor sot, characterized in that water is added to the metal alkoxide at −20° C. or lower in a method for producing a metal oxide precursor sol by hydrolyzing and polymerizing one or more metal alkoxides.

It is known, as a process for forming a thin metal oxide film on the surface of a base plate by a sol-gel method, that a metal alkoxide used as a starting material is hydrolyzed and polymerized to prepare a metal oxide precursor sol and the obtained sol is coated on the surface of a base plate to form a thin film of the metal oxide gel on the surface of the plate, then the gel film is heated at an appropriate temperature. Of these methods, a preferable example is a process that an organic compound able to coordinate to multiple sites is added to stabilize a metal alkoxide so as to control the hydrolysis rate for producing a filmable sot, and the sot is used to form a film according the aforementioned method. Actual examples are that a β-diketone is effective for forming an alumina thin film using aluminum s-butoxide as a starting material [Journal of the Ceramic Society of Japan, 97, 369 (1989)]; and for forming a titania thin film using titanium isopropoxide as a starting material, 1,3-butan-diol is effective [Sumio Koshiba, Toyohashi University of Technology, Doctoral Thesis, March, 1993]; and a β-diketone is effective [Journal of the Ceramic Society of Japan, 97, 213 (1989)]. For forming a zirconia thin film using zirconium n-butoxide as a starting material, use of diethylene glycol is reported to be effective [Journal of the Ceramic Society of Japan, 95, 942 (1987)]. Furthermore, there are reports that use of β-diketones or alkanolamines is effective for the syntheses of composite oxides, such as $PbTiO_3$ and $Pb(Zr,Ti)O_3$, in Journal of American Ceramic Society, 74, 1407 (1991) and Journal of the Ceramic Society of Japan, 98, 745 (1990).

Processes for the preparation of oxide films that make use of hydrolyses of various inorganic salts, such as chlorides, sulfates, nitrates and ammonium salts, and aqua complexes are reported in Physics of Tin Film, 5, p 87 (1969), Academic Press. In addition, Journal of the Ceramic Society of Japan, 102, 200 (1994) describes use of indium nitrate and tin chloride, instead of a metal alkoxide, to prepare an $In_2O_3$—$SnO_2$ sot as a composite oxide.

However, in either case of Japanese Patent Laid-open No. Hei 8-157735 or 11-14949, a metal alkoxide is hydrolyzed and dehydration condensed with an acid or a base, and the solvent, water, acid or base is distilled out for bulk polymerization. It is difficult to completely remove the used water, acid or base. Therefore, a problem was the effect of these remaining substances on the polymerization reaction. Particularly when solution polymerization is carried out in an organic solvent, it is necessary to use an acid, a base or a dispersion stabilizer to make the product of the metal alkoxide hydrolysis existing stably in a solution. Therefore, a problem was that these inhibit the polymerization or give bad effects on the physical properties of the product. Furthermore, the said organic-inorganic composite prepared with a titanium oxide gel generally tends to have lower transmittance than that of inorganic-organic composites produced with other metal oxide gels. This fact suggests that titanium oxide aggregates at the stage of concentration following the hydrolysis and dehydration condensation.

The transparent, homogeneous metal oxide sols disclosed in Japanese Patent Laid-open No. Hei 10-298697 also have the same problem as those described above because the pH is in the acidic region.

According to the said process for stabilizing a metal alkoxide by adding a multidentate compound so as to control the hydrolysis rate of the metal alkoxide, a homogeneous sol for forming a film is easily prepared. However, many organic substances that are hard to decompose due to their high boiling points coexist in the sol or gel film. As a result, it is necessary to heat the gel film at a temperature as high as about 500° C. in order to remove the organic substances. Because of many organic substances remaining in the gel film, a heat treatment of the gel film greatly reduces the film weight. In other words, the removal of the organic substances from the gel film creates many pores in the film, being a cause of defects of the obtained thin metal oxide film. There was a problem that various characteristics of the metal oxide, such as mechanical, optical and electric, were not fully displayed. On the other hand, the removal of the pores in the film needs extra energy to make the thin film dense. As described above, the processes using metal salts are basically thermal decomposition methods that cause many problems in film qualities after heat treatment.

It is an object of the present invention to provide a process for the preparation of a thin metal oxide film at a temperature as low as 200° C. or below, and a metal oxide sol suitable for producing a homogeneous organic-inorganic composite, as well as a thin metal oxide film and organic-inorganic composite that have various functions, particularly an organic-inorganic composite with a high refractive index and high transparency.

DISCLOSURE OF INVENTION

The inventors studied in earnest to achieve the object. As a result, they found that a metal oxide sol dispersible stably in an organic solvent could be produced by means of controlling an amount of water used and reaction temperature without using an acid, a base or a dispersion stabilizer for a metal alkoxide, and further that a thin metal film could be formed using the sol and a homogeneous organic-inorganic composite be prepared by a polymerization reaction in the presence of the sol. Thus the present invention has been completed.

The present invention relates to:

(1) a dispersed ingredient having metal-oxygen bonds, characterized in that it is stably dispersed in an organic solvent without aggregating in the absence of an acid, a base and/or a dispersion stabilizer;

(2) a dispersed ingredient having metal-oxygen bonds according to (1), in which the dispersed ingredient is a product of metal alkoxide hydrolysis;

(3) a dispersed ingredient having metal-oxygen bonds that is stably dispersed in an organic solvent without aggregating, characterized in that it is produced by hydrolyzing a metal alkoxide with 0.5 to less than 1 mol of water per mol of the metal alkoxide in an organic solvent in the absence of an acid, a base and/or a dispersion stabilizer;

(4) a dispersed ingredient having metal-oxygen bonds that is stably dispersed in an organic solvent without aggregating, characterized in that it is produced by hydrolyzing a metal alkoxide with 1.0 to less than 2.0 mol of water per mol of the metal alkoxide in an organic solvent at −20° C. or lower in the absence of an acid, a base and/or a dispersion stabilizer;

(5) a dispersed ingredient having metal-oxygen bonds that is stably dispersed in an organic solvent without aggregating, characterized in that it is produced by hydrolyzing a metal alkoxide with 1.0 to less than 2.0 mol of water per mol of the metal alkoxide in an organic solvent at a temperature of −50 to −100° C. in the absence of an acid, a base and/or a dispersion stabilizer;

(6) a dispersed ingredient having metal-oxygen bonds, characterized in that it is stably dispersed in a solvent, and a concentration by weight, in terms of the metal oxide, of the ingredient in a solution containing the dispersed ingredient having metal-oxygen bonds that is obtained by hydrolyzing a metal alkoxide in a solvent is 1.2 times or higher than that of the metal alkoxide before the hydrolysis;

(7) a dispersed ingredient having metal-oxygen bonds, characterized in that it is stably dispersed in a solvent, and a concentration by weight, in terms of the metal oxide, of the hydrolysis product in a solution containing a dispersed ingredient having metal-oxygen bonds that is obtained by hydrolyzing a metal alkoxide in a solvent is 1.4 times or higher than that of the metal alkoxide before the hydrolysis;

(8) a dispersed ingredient having metal-oxygen bonds according to (6) or (7), in which the solvent is an organic solvent;

(9) a dispersed ingredient having metal-oxygen bonds according to one of (6) to (8), in which the dispersed ingredient having metal-oxygen bonds that is produced by hydrolyzing a metal alkoxide in a solvent is a dispersed ingredient having metal-oxygen bonds according to one of (2) to (5);

(10) a dispersed ingredient having metal-oxygen bonds according to one of (6) to (8), in which the ingredient is produced by concentrating a solution of the dispersed ingredient having metal-oxygen bonds according to one of (2) to (5);

(11) a dispersed ingredient having metal-oxygen bonds according to one of (1) to (10), in which the solution containing the dispersed ingredient having metal-oxygen bonds is optically transparent;

(12) a dispersed ingredient having metal-oxygen bonds according to one of (2) to (11), in which the metal is one or more metals selected from the group consisting of titanium, zirconium, aluminum, silicon, germanium, indium, tin, tantalum, zinc, tungsten and lead;

(13) a thin metal oxide film, characterized in that it is produced from a dispersed ingredient according to one of (1) to (12);

(14) a process for the preparation of a thin metal oxide film, characterized in that a solution containing a dispersed ingredient according to one of (1) to (12) is coated and dried at 200° C. or below;

(15) a process for the preparation of a thin metal oxide film according to (14), in which a solution containing fine particle seed crystals of the metal oxide is coated and dried at 200° C. or below;

(16) a process for the preparation of a thin metal oxide film according to (14) or (15), in which the coating is further irradiated with UV rays of 360 nm or shorter in wavelength;

(17) an organic-inorganic composite, characterized in that it contains a dispersed ingredient having metal-oxygen bonds according to one of (1) to (12) or an inorganic polymer produced using the ingredient as a starting material, as an inorganic component;

(18) an organic-inorganic composite according to (17), in which the organic component is one or more resins selected from the group consisting of acrylic resins, polythiourethane resins, and resins obtained from compounds containing epithio groups;

(19) an optical material, characterized in that it contains an organic-inorganic composite according to (17) or (18);

(20) an optical product consisting of the optical material according to (19);

(21) an optical product according to (20), in which the product is a plastic lens; and

(22) a process for the preparation of the organic-inorganic composite according to (17) or (18), in which an organic monomer is polymerized in the presence of a dispersed ingredient having metal-oxygen bonds according to one of (1) to (12).

The dispersed ingredient of the present invention is characterized by stable dispersion without aggregating in an organic solvent in the absence of an acid, a base and/or a dispersion stabilizer.

In this case, the dispersed ingredient refers to very fine particles dispersing in a dispersion system. An actual example is colloidal particles. Any organic solvent can be used if it is an organic substance and can disperse the ingredient. Its actual examples include alcoholic solvents such as methanol, ethanol and isopropyl alcohol; chlorine solvents such as methylene chloride and chloroform; hydrocarbonic solvents such as hexane, cyclohexane, benzene, toluene, xylene and chlorobenzene; ethereal solvents such as tetrahydrofuran, diethyl ether and dioxane; ketonic solvents such as acetone, methyl ethyl ketone and methyl isobutyl ketone; aprotic polar solvents such as dimethylformamide, dimethyl sulfoxide and N-methylpyrollidone; and silicones that are used as dispersing media for dispersed titanium dioxide in Japanese Patent Laid-open No. Hei 9-208438, such as methyl polysiloxane, octamethylcyclotetrasiloxane, decamethylcyclopentane siloxane and methylphenyl polysiloxane. As described later, in order to carry out a hydrolysis reaction with water at a low temperature, it is preferable to use a solvent that is readily soluble in water and does not solidify at a low temperature. Preferred examples include lower alcoholic solvents and ethereal solvents. These solvents can be used alone or as a mixture of two or more.

Any acid or base can be used in the present invention, if it functions as a deflocculant to disperse again precipitates due to aggregation; as a catalyst to produce a dispersed ingredient, such as colloidal particles, by hydrolysis and dehydration condensation of a metal alkoxide or the like, as described later; and as a dispersing agent for the produced dispersed ingredient. Actual examples of the acid include mineral acids such as hydrochloric acid, nitric acid, boric acid and fluoroboric acid; and organic acids such as acetic acid, formic acid, oxalic acid, carbonic acid, trifluoroacetic acid, p-toluenesulfonic acid and methane sulfonic acid. In addition, also included are photoacid generators which generate acids by light irradiation. They are exemplified by diphenyliodonium hexafluorophosphate and triphenylphosphonium hexafluorophosphate. Examples of the base include triethanolamine, triethylamine, 1,8-diazabicyclo[5.4.0]-7-undecene, ammonia and phosphine.

A dispersion stabilizer used in the present specification refers to a component which is added to disperse an ingredient in a dispersing medium as stable as possible. Its examples include aggregation inhibitors and others, such as defloculants, protective colloids and surface active agents. Actual examples of compounds with such actions include chelating compounds. Favored are those having at least one carboxyl group in the molecular skeleton and strong chelating effects to metal. Examples of such compounds include polycarboxylic acids and hydroxycarboxylic acids such as glycolic acid, gluconic acid, lactic acid, tartaric acid, citric acid, malic acid and succinic acid. In addition, pyrophosphoric acid, tripolyphosphoric acid and the like are exemplified. Other examples of multidentate compounds having strong chelating capacity to metal atoms include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione and 5-methylhexane-dione. In addition, examples of aliphatic amines, hydrostearic acids and polyester amines include Throupass 3000, 9000, 17000, 20000 and 24000 (produced by Zeneca Co., Ltd.), and Disperbyk-161, -162, -163 and -164 (produced by Bichemie Co., Ltd.). The silicone compounds and others that are disclosed in Japanese Patents Laid-open Nos. Hei 9-208438, Hei 2000-53421 and others, such as dimethyl polysiloxane, methyl(polysiloxyalkylene)siloxane copolymers, trimethylsiloxysilicic acid, carboxy-modified silicone oil and amine-modified silicones, are also exemplified.

A state of stable dispersion without aggregation in the present invention refers to a condition that a dispersed ingredient having metal-oxygen bonds is not aggregated so as not to disperse heterogeneously in an organic solvent, and preferably to a transparent, homogeneous condition. In this case, "transparent" refers to a condition of high transmittance of visible rays. Concretely, it represents spectroscopic transmittance measured under the conditions that a concentration of the dispersed ingredient is 0.5% by weight in terms of oxide, the optical path length of a quartz cell is 1 cm, a control sample is an organic solvent, and light wavelength is 550 nm. The transmittance is favorably 80 to 100%. A particle diameter of the dispersed ingredient of the present invention is not particularly restricted. To attain high transmittance of visible rays, the particle is preferably in a range of 1 to 100 nm, more preferably 1 to 50 nm, and further preferably 1 to 10 nm, in diameter.

Any process for the preparation of a dispersed ingredient having metal-oxygen bonds can be used in the present invention, if a dispersed ingredient with such properties as those described above is produced. Examples of processes include, in the case of titanium used as a metal atom, hydrolysis of an inorganic titanium compound, such as titanium chloride, titanium oxychloride, titanium sulfate or titanyl sulfate, with water, followed by neutralization with an appropriate base if necessary, and hydrolysis of an organic titanium compound, such as a titanium alkoxide, with water. The method for hydrolyzing a metal alkoxide is particularly favorably exemplified as a process for producing a stably dispersible ingredient having metal-oxygen bonds Actual examples of metal atoms used in the present invention include one element or combinations of two or more elements selected from the group consisting of alkali metal elements of the 2nd to 6th periods of the periodic table, alkaline earth metal elements and Group 3B elements, Groups 4B and 5B elements of the 3rd to 6th periods of the periodic table, transition metal elements and lanthanide elements. Particularly preferred are titanium, zirconium, aluminum, silicon, germanium, indium, tin, tantalum, zinc, tungsten and lead.

Actual examples of starting materials for producing dispersed ingredients having metal-oxygen bonds in the present invention include silicon alkoxides such as $Si(OCH_3)_4$, $Si(OC_2H_5)_4$, $Si(i-OC_3H_7)_4$ and $Si(t-OC_4H_9)_4$; titanium alkoxides such as $Ti(OCH_3)_4$, $Ti(OC_2H_5)_4$, $Ti(i-OC_3H_7)_4$ and $Ti(OC_4H_9)_4$; zirconium alkoxides such as $Zr(OCH_3)_4$, $Zr(OC_2H_5)_4$, $Zr(OC_3H_7)_4$ and $Zr(OC_4H_9)_4$; aluminum alkoxides such as $Al(OCH_3)_3$, $Al(OC_2H_5)_3$, $Al(i-OC_3H_7)_3$ and $Al(OC_4H_9)_3$; germanium alkoxides such as $Ge(OC_2H_5)_4$; indium alkoxides such as $In(OCH_3)_3$, $In(OC_2H_5)_3$, $In(i-OC_3H_7)_3$ and $In(OC_4H_9)_3$; tin alkoxides such as $Sn(OCH_3)_4$, $Sn(OC_2H_5)_4$, $Sn(i-OC_3H_7)_4$ and $Sn(OC_4H_9)_4$; tantalum alkoxides such as $Ta(OCH_3)_5$, $Ta(OC_2H_5)_5$, $Ta(i-OC_3H_7)_5$ and $Ta(OC_4H_9)_5$; tungsten alkoxides such as $W(OCH_3)_6$, $W(OC_2H_5)_6$, $W(i-OC_3H_7)_6$ and $W(OC_4H_9)_6$; zinc alkoxides such as $Zn(OC_2H_5)_2$; and lead alkoxides such as $Pb(OC_4H_9)_4$. Partially hydrolyzed products of the metal alkoxides exemplified in the above are also included in the metal alkoxides for use in the present invention. Also included are composite alkoxides produced by reactions between metal alkoxides of two or more of the said elements or between one or more metal alkoxides and one or more metal salts. Furthermore, these can be combined to use.

Examples of the composite alkoxides produced by reactions between two or more metal alkoxides include those prepared by reacting alkoxides of alkali metal or alkaline earth metal with alkoxides of transition metal, and composite alkoxides as complex salts obtained by combinations of Group 3B elements. Actual examples include $BaTi(OR)_6$, $SrTi(OR)_6$, $BaZr(OR)_6$, $SrZr(OR)_6$, $LiNb(OR)_6$, $LiTa(OR)_6$ and combinations of these, $LiVO(OR)_4$ and $MgAl_2(OR)_8$. Other examples include reaction products with silicone alkoxides, such as $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$ and $(RO)_3SiOTa(OR')_4$, and their condensation polymerization products. In the above formulae, R and R' are alkyl. Examples of the composite alkoxides produced by reactions of one or more metal alkoxides with one or more metal salts include compounds obtained by reacting metal salts, such as chlorides, nitrates, sulfates, acetates, formates and oxalates, with alkoxides.

The alkoxy group of the metal alkoxide can have any number of carbons, and preferably 1 to 4 carbons because of such reasons as a concentration of oxide contained, easy removal of organic substances and easy availability. An acyloxy group, which is more easily hydrolyzed, such as an acetoxy group, can be used instead of the alkoxy group. In this case, it is necessary to neutralize the carboxylic acid produced after the hydrolysis.

A metal alkoxide exemplified in the above is treated either (1) with 0.5 to less than 1.0 mol of water per mol of the metal alkoxide in an organic solvent in the absence of an acid, a base and/or a dispersion stabilizer, or (2) with 1.0 to less than 2.0 mol of water per mol of the metal alkoxide in an organic solvent in the absence of an acid, a base and/or a dispersion stabilizer at −20° C. or lower, preferably in a range of −50 to −100° C., in order to produce a dispersed ingredient having metal-oxygen bonds that is stably dispersed without aggregating in an organic solvent. It is possible to hydrolyze a metal alkoxide with an amount of water described in the above (1) at an appropriate temperature, followed by a reaction with a more amount of water added under the temperature condition set in the above (2).

There are no restrictions on a type of water used if it is neutral. Use of pure water or distilled water is, however, preferred. Any amount of water can be used if it is within the range described above, and decided depending on the dispersed ingredient with target properties.

The reaction of a metal alkoxide with water in the above (1) can be carried out in an organic solvent, and also by directly mixing a metal alkoxide with water without using an organic solvent.

In the above (2), a metal alkoxide can be reacted with water in a way that water diluted with an organic solvent is added to a solution of a metal alkoxide in the organic solvent, or a metal alkoxide or a solution of a metal alkoxide diluted with an organic solvent is added to the organic solvent in which water is suspended or dissolved. Water is preferably added later.

There are no restrictions on a concentration of a metal alkoxide or water in an organic solvent, if it is in a range that a rapid heat dissipation is controlled and the solution is fluid enough to stir. It is usually favorably in a range of 5 to 30% by weight of the metal alkoxide.

The reaction of a metal alkoxide with water in the above (1) can be carried out at any temperature, in a range of −100 to 100° C. It is usually from room temperature to the boiling point of the alcohol leaving due to hydrolysis.

A reaction temperature of the reaction of a metal alkoxide with water in the above (2) depends on the stability of the metal alkoxide. There are no restrictions if the temperature is −20° C. or below. It is preferable to add water to a metal alkoxide in a temperature range of −50° C. to −100° C., depending on a type of metal alkoxide used. It is possible to add water at a low temperature for maturing for a certain period of time, and then to further carry out reactions of hydrolysis and dehydration condensation from room temperature to the reflux temperature of the solvent used. An addition of water at a temperature as low as −20° C. or below makes hydrolysis and polymerization of the metal alkoxide possible at a high concentration, without adding a dispersion stabilizer, such as a multidentate compound, to stabilize the metal alkoxide hydrolysate. Thanks to this, a high-concentration dispersion solution containing none of unnecessary organic substances, such as the multidentate compound, can be obtained. As a result, use of the dispersion solution gives gel films, gel fibers or bulk gels that contain less amounts of organic substances. Removal of the organic substances from these gels by such a means as heating may result in less destruction of the fine structure and a reduction of an amount of remaining pores in the obtained molding.

The present invention is characterized in that a dispersed ingredient having metal-oxygen bonds prepared by hydrolysis of a metal alkoxide in a solvent according to the methods described above is stably dispersed in a solvent even if a concentration by weight, in terms of metal oxide, of the ingredient in the solution is 1.2 times or higher, even 1.4 times or more, of that of the metal alkoxide before the hydrolysis. This means that the dispersed particles do not aggregate, even if a solution of which an ingredient having metal-oxygen bonds is dispersed in an organic solvent at a high concentration is further concentrated by distilling out the organic solvent at room temperature or above, preferably 80° C. or below. The resulting solution becomes a homogeneous, transparent dispersion solution when the organic solvent is added to it again. The state of the high concentration includes a condition of no solvent. At the state of no solvent, metal may take a form of solid, liquid or gelled, or a mixed state of these.

A thin metal oxide film and an organic-inorganic composite can be produced from a dispersed ingredient having metal-oxygen bonds that is prepared according to the methods described above and/or from an inorganic polymer produced from the said ingredient used as a starting material.

A process for the preparation of a thin metal oxide film is characterized in that a solution containing the said dispersed ingredient is coated and dried at 200° C. or below.

A concentration of the ingredient in a solution containing the dispersed ingredient described in the above depends on a coating method and target film thickness, but is not particularly restricted if the solution can be coated on a base plate. Concretely, it is preferable to be in a range of 5 to 50% by weight in terms of the oxide.

As for solvents to use to make solutions, the same solvents as those used for dispersing the said ingredient can be exemplified. It is particularly preferable to use the same solvent as that used to disperse the said ingredient. A different solvent may be used if it does not affect the dispersibility of the ingredient.

Other components can be added, if necessary, to the solution containing the said dispersed ingredient. Actual examples of the other components include silicon compounds such as water glass, colloidal silica and polyorganosiloxanes; phosphates such as zinc phosphate and aluminum phosphate;

hydrogen phosphates; inorganic binders such as cement, lime, gypsum, frit for enamel, glaze for glass lining and plaster; and organic binders such as fluorine polymers, silicone polymers, acrylic resins, epoxy resins, polyester resins, melamine resins, urethane resins and alkyd resins. These binders can be used alone or a mixture of two or more. The inorganic binders, fluorine polymers and silicone polymers are particularly preferred from the viewpoint of adhesion strength.

Examples of cements for use include Portland cements such as high-early-strength cement, cement, moderate-heat cement, sulfuric acid salt resistance cement, white cement, oil well cement and geothermal well cement; mixed cements such as fly ash cement, high sulfuric acid salt content cement, silica cement and Portland blastfurnace cement; and almina cement. Gypsum plaster, lime plaster and dolomite plaster can be exemplified as plasters. As for fluorine polymers, for example, crystalline fluorine resins such as polyvinyl fluoride, polyvinylidene fluoride, polyethylene chloride trifluoride, polyethylene tetrafluoride, copolymers of polyethylene tetrafluoride and propylene hexafluoride, copolymers of ethylene and polyethylene tetrafluoride, copolymers of ethylene and ethylene chloride trifluoride and copolymers of ethylene tetrafluoride and perfluoroalkyl vinyl ethers; amorphous fluorine resins such as perfluorocyclo polymers, copolymers of vinyl ether and fluoroolefin and copolymers of vinyl esters and fluoroolefin; and various types of fluorine rubbers can be used. Fluorine polymers containing vinyl ether-fluoroolefin copolymers or vinyl ester-fluoroolefin copolymers as the main components are particularly preferred because of less decomposition and degradation and easy handling. As for silicone polymers, modified silicone resins, such as straight-chain silicone resins, acryl modified silicone resins, acryl-silicone resins and epoxy-silicone resins, and various types of silicone rubbers can be used.

A ratio of the said dispersed ingredient to the other components exemplified in the above is 5 to 98% by weight, preferably 20 to 98% by weight, more preferably 50 to 98% by weight and most preferably 70 to 98% by weight. A solution containing the said dispersed ingredient can be blended, if required, with heat stabilizers, anti-oxidants, UV absorbers, antistatic agents, coloring agents, surface active agents, crosslinking agents, dispersing agents and fillers. Ordinary crosslinking agents, such as isocyanate and melamine agents, can be used as the crosslinking agents. Dispersing agents for use include coupling agents.

Any known method, such as spin coating, dip coating, spray coating, roll coating and screen printing, can be applied as a method for coating a solution containing the said dispersed ingredient on a base material. The roll coating is preferred for inexpensive mass production. A method of using a bar or geeser is particularly preferred. A screen or offset printing method is also favored from the viewpoint that patterning can be done when coating. A coating amount depends on applications of the obtained thin film, and is generally 0.1 to 10 ml/m$^2$, preferably 0.2 to 7 ml/m$^2$, and more preferably 0.4 to 5 ml/m$^2$, as a coating amount of active ingredients other than solvents.

Examples of base materials for use include inorganic material articles such as ceramics and glass; organic material articles such as plastics, rubber, wood and paper; and metal material articles such as aluminum and other metals and steel and other alloys. A base material can be of any size and shape. Any of flat boards, three-dimensional articles, films and other shapes can be used. Coated articles can also be employed. Among them, plastic films are preferred. Their examples include cellulose triacetate, cellulose diacetate, nitrocellulose, polystyrene, polyethylene terephtalate, polyethylene naphthalate, syndiotactic polystyrene, polyethylene coated paper, polyether sulfone, polyarylate, polyvinylidene fluoride and Teflon. Waterproofing layers containing polyvinylidene chloride polymers can be placed on these supports in order to improve so-called dimensional stability of which a dimension alters due to changes in temperature or humidity. In addition, thin films made of organic and/or inorganic compounds can be coated for the purpose of gas barriers.

Examples of organic thin films include polyvinyl alcohol and poly (ethylene-co-vinyl alcohol). Silica, almina, talc, permiculite, kaolinite, mica and synthetic mica are exemplified as inorganic compounds. Various organic and/or inorganic additives can be added into base plates for endowing with other various functions.

A coated film is heated to dry the solvent as well as for hydrolysis and dehydration condensation of the said dispersed ingredient. It is advisable to heat after coating at a temperature as low as 200° C. or below, preferably 20° C. to 100° C., more preferably 30° C. to 80° C., so as not to damage the base plate. There are no restrictions how many hours the film is heated. It is usually between 1 minute and 120 hours at discretion.

In the present invention, if the formed thin film needs mechanical strength, a protective film is formed on the thin film. To form the protective film, an ordinary coating solution for a forming protective film, such as a coating solution for forming a silica coat that contains alkoxysilane hydrolysates, is used.

In the present invention, fine particle seed crystals of the target metal oxide are preferably added to a coating solution containing a dispersed ingredient having metal-oxygen bonds, in the case of a thin metal oxide film that needs to be crystallized. An addition ratio of fine particle seed crystals of the metal oxide is preferably 10% to 90% by weight, particularly preferably 10% to 80% by weight, of the weight of the sol when a sol is formed from the dispersed ingredient. As described later, in the present invention, the metal oxide may be crystallized by irradiation with light. In this case, an addition of seed crystals further facilitates the crystallization of the metal oxide.

A seed crystal can be of any size, and preferably 0.1 μm or smaller, in ball conversion, from the viewpoint of transmittance.

A seed crystal to be added may be other than the target metal oxide itself, and can be a compound convenient for heteroepitaxy, such as that having the same crystal form as that of the target metal oxide and/or a lattice constant close to that of the oxide. For example, indium oxide can be used as a seed crystal for producing an ITO thin film.

Commercially available or synthesized products can be used as the aforementioned seed crystals. In case a thin metal oxide film is ITO, products marketed by Mitsubishi Material Co., Ltd. and Sumitomo Kinzoku Kozan Co., Ltd. can be used. Examples of synthetic methods include sol-gel methods, hydrothermal syntheses and usual sintering. Detailed descriptions of the sol-gel methods are found in "Science of Sol-Gel Method, Sumio Sakuhana, published by Agune Shofusha Co., Ltd (1988)", "Thin Film Coating Technology by Sol-Gel Methods, edited by Gijutsu Joho Kyokai (1994)", "Status Quo and Prospect of Sol-Gel Methods, supervised by Masayuki Yamane and published by Gijutu Joho Service Kondankai [ATIS] Sol-Gel Method Report Kankokai (1992)" and others.

In a method of the present invention for forming a thin film, it is preferable to irradiate the film with light when a coated film is heated and/or after it is heated. Any light source can be used to irradiate a coated film with UV rays or visible rays as long as it generates light of 150 nm to 700 nm in wavelength. Examples of light sources include ultra-high pressure mercury lamps, high pressure mercury lamps, low pressure mercury lamps, xenon lamps, halogen lamps and sodium lamps. Preferred are ultra-high pressure mercury lamps, high pressure mercury lamps, low pressure mercury lamps and xenon lamps. A transparent, electrically conductive pattern can be formed by using a photomask together. A laser oscillator can also be used. Its examples include excimer laser, argon laser, helium neon laser, semiconductor laser, YAG laser, carbon dioxide gas laser and coloring matter laser. When a laser beam is used, compounds other than those irradiated do not become metal oxides. Therefore, a pattern can be formed without using screen printing or other methods when coating. A synchrotron radiation beam can also be used. These devices are selected in consideration of wavelength for irradiation. When a coating solution containing the said dispersed ingredient is reacted, a metal oxide is produced and a metal hydroxide remains as well. It is advisable to use a device generating light containing UV rays of 400 nm or shorter in consideration of the absorption of the metal-OH bond of the metal hydroxide. Further, when a dehydration reaction proceeds to form a metalloxane network, irradiation of light with a wavelength able to activate the metal-O-metal bond accelerates the crystallization of the metal oxide, even though the absorption of the metal-O-metal bond is shorter in wavelength than that of the metal-OH bond. Light can be irradiated for any length of time. It is usually between 1 minute and 120 hours at discretion.

In the present invention, an atmosphere is at discretion for the light irradiation process. It is preferably carried out in an atmosphere of reduction to some extent. It is considered that, under an atmosphere of reduction to some extent, an increase in carrier density and/or adsorption of oxygen molecules on the grain boundary due to increased oxygen defects are controlled.

Meanwhile, a solvent with a high boiling point and low molecular weight that is decomposed by light irradiation may also be used. Examples of such a solvent include isophorone and benzyl acetate.

A light-disintegrating resin can be added to a solution containing the said dispersed ingredient in the case of light irradiation. Examples of the resin include polymethylvinyl ketone, polyvinyl phenyl ketone, polysulfone, diazonium salts such as polycondensation products of p-diazodiphenylamine and paraformaldehyde, quinone diazides such as isobutyl 1,2-naphthoquinon-2-diazid-5-sulfonate, polymethyl methacrylate, polyphenylmethylsilane and polymethylisopropenyl ketone. It is advisable to use at a ratio of 0 to 1000 parts by weight of the said resin per 100 parts by weight of the total of a metal alkoxide or metal salt.

A light sensitizer is preferably added as another additive to a solution containing a metal alkoxide and/or metal salt, in the case of light irradiation, if the wavelength of the irradiating light differs from the absorption wavelength of the metal alkoxide, metal salt and/or these chelate compounds.

A solution containing the said dispersed ingredient may be dried at 200° C. or below after it is coated on a base material. It is preferable to dry it at 150° C. or lower.

Any organic substance can be used as an organic component in an organic-inorganic composite. Any of resins of addition polymers, polyaddition products and polycondensation polymers can be used. Their actual examples are described in the following.

Examples of acrylic resins include polymerization products of monomers described below as starting materials: Examples of monofunctional methacrylates include methyl methacrylate, ethyl methacrylate, n-butyl methacrylate, hexyl methacrylate, benzyl methacrylate, phenyl methacrylate, cyclohexyl methacrylate, isobornyl methacrylate and adamantyl methacrylate. Examples of multifunctional methacrylates include ethylene glycol dimethacrylate, diethylene glycol dimethacrylate, triethylene glycol dimethacrylate, tripropylene dimethacrylate, 1,4-butanediol dimethacrylate, 1,6-hexanediol dimethacrylate, trimethylolpropane trimethacrylate, pentaerythritol trimethacrylate, glycerin dimethacrylate, 2,2-bis[4-(methacryloxy)phenyl]propane and 2,2-bis[4-(methacryloxyethoxy)phenyl]propane. Examples of monofunctional acrylates include methyl acrylate, ethyl acrylate, n-butyl acrylate, hexyl acrylate, cyclohexyl acrylate, benzyl acrylate, phenyl acrylate and isobornyl acrylate. Examples of multifunctional acrylates include ethylene glycol diacrylate, triethylene glycol diacrylate, 1,6-hexanediol diacrylate, trimethylolpropane triacrylate and pentaerythritol triacrylate. Further, examples of monomers copolymerizable with the said acrylic or methacrylic compounds include nucleus-substituted styrenes and α-methylstyrenes such as styrene, methylstyrene, dimethylstyrene, chlorostyrene, dichlorostyrene, bromostyrene, p-chloromethylstyrene and divinyl benzene; acrylonitrile, methacrylonitrile, maleic anhydride and N-substituted maleimides. Copolymers of these with the aforementioned acrylic or methacrylic compounds are also included in the acrylic resins.

Preferred are organic monomers capable of radical or cationic polymerization and particularly favored are those having at least one of bonds selected from an amide bond, imide bond, urethane bond and urea bond. Of the organic monomers mentioned above, radically polymerizable organic monomers are exemplified by (meth)acrylamide, (meth)acrylamide derivatives, (meth)acryloyl morpholine, N-vinyl pyrolidone, (meth)urethane acrylate, and adducts of aminoalkyl (meth)acrylates and isocyanate. Here, the (meth)acrylamide refers to both of methacrylamide and acrylamide; and (meth)acrylate to both of methacrylate and acrylate.

Among the said organic monomers, compounds having epoxy rings, vinyl ether bonds or ortho-spiro rings as polymerization functional groups are exemplified as monomers capable of cationic polymerization. Optional organic monomers may be used together with the said essential organic monomers in order to improve the quality of the obtained polymers. The optional organic monomers for this purpose do not necessarily have amide bonds, urethane bonds or urea bonds.

However, the optional organic monomers must be polymerized in the same manner (radical or cationic polymerization) as that of the said essential monomers.

Actual examples of the optional organic monomers include methyl (meth)acrylate, tricyclo[5.2.1.0]decanyl (meth)acrylate, neopentyl glycol di(meth)acrylate and 3,3,3-trifluoroethyl (meth)acrylate when the essential monomers are radically polymerizable; and ethylene glycol diglycidyl ether, propylene glycol diglycidyl ether and hydrogenated bisphenol A diglycidyl ether, in case the essential monomers react in the manner of cationic polymerization.

The poly(thio)urethane resin refers to a polythiourethane or polyurethane resin obtained by a reaction of a polyisocyanate compound with a polythiol compound or polyhydroxy compound.

Any polyisocyanate compound can be used. Its actual examples are described in the following.

(i) Alicyclic isocyanates such as hydrogenated 2,6-tolylene diisocyanate, hydrogenated meta- and para-phenylene diisocyanate, hydrogenated 2,4-tolylene diisocyanate, hydrogenated diphenylmethane diisocyanate, hydrogenated meta-xylylene diisocyanate, hydrogenated para-xylylene diisocyanate and isophorone diisocyanate.

(ii) Isocyanates having aromatic rings such as meta- and para-phenylene diisocyanate, 2,4-tolylene diisocyanate, 2,6-tolylene diisocyanate, 4,4'-diphenylmethane diisocyanate, meta- and para-xylylene diisocyanate, meta- and para-tetramethylxylylene diisocyanate, 2,6-naphthalene diisocyanate and 1,5-naphthalene diisocyanate. (Preferred are 2,4- and 2,6-tolylene diisocyanate, 4,4'-diphenylmethane diisocyanate, meta-xylylene diisocyanate, meta-tetramethylxylylene diisocyanate, 2,6-naphthalene diisocyanate, and others.)

(iii) Isocyanates having none of alicyclic and aromatic rings such as hexamethylene diisocyanate, octamethylene diisocyanate, 2,2,4-trimethylhexamethylene diisocyanate, tetramethylene diisocyanate, buret reaction products of hexamethylene diisocyanate, trimers of hexamethylene diisocyanate, lysine diisocyanate, lysine triisocyanate, 1,6,11-undecane triisocyanate and triphenylmethane triisocyanate.

(iv) Isocyanates containing sulfur such as diphenyl disulfide-4,4'-diisocyanate, 2,2'-dimethyldiphenyl disulfide-5,5'-diisocyanate, 3,3-dimethyldiphenyl disulfide-5,5'-diisocyanate, 3,3'-dimethyldiphenyl disulfide-6,6'-diisocyanate, 4,4'-dimethyldiphenyl disulfide-5,5'-diisocyanate, 3,3'-dimethoxydiphenyl disulfide-4,4'-diisocyanate, 4,4'-dimethoxydiphenyl disulfide-3,3'-diisocyanate, diphenyl sulfone-4,4'-diisocyanate, diphenyl sulfone-3,3'-diisocyanate, benzylidene sulfone-4,4'-diisocyanate, diphenylmethane sulfone-4,4'-diisocyanate, 4-methyldiphenylmethane sulfone-2,4'-diisocyanate, 4,4'-dimethoxydiphenyl sulfone-3,3'-diisocyanate, 3,3'-dimethoxy-4,4'-diisocyanate dibenzyl sulfone, 4,4'-dimethyldiphenyl sulfone-3,3'-diisocyanate, 4,4'-di-tert-butyldiphenyl sulfone-3,3'-diisocyanate, 4,4'-dimethoxybenzene ethylene disulfone-3,3'-diisocyanate, 4,4'-dichlorodiphenyl sulfone-3,3'-diisocyanate, 4-methyl-3-isocyanate benzenesulfonyl-4'-isocyanate phenol ester, 4-methoxy-3-isocyanate benzenesulfonyl-4'-isocyanate phenol ester, 4-methyl-3-isocyanate benzenesulfonylanilide-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate, 4-methyl-3-isocyanate benzenesulfonylanilide-4-methyl-3'-isocyanate, thiophene-2,5-diisocyanate, thiophene-2,5-diisocyanate methyl, 1,4-dithian-2,5-diisocyanate, 1,4-dithian-2,5-diisocyanate methyl, 1,4-dithian-2,3-diisocyanate methyl, 1,4-dithian-2-isocyanate methyl-5-isocyanate propyl, 1,3-dithiolan-4,5-diisocyanate, 1,3-dithiolan-4,5-diisocyanate methyl, 1,3-dithiolan-2-methyl-4,5-diisocyanate methyl, 1,3-dithiolan-2,2-diisocyanate ethyl, tetrahydrothiophene-2,5-diisocyanate, tetrahydrothiophene-2,5-diisocyanate methyl, tetrahydrothiophene-2,5-diisocyanate ethyl and tetrahydrothiophene-3,4-diisocyanate methyl.

Examples of polythiol compounds include the following:

(i) Aliphatic thiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropan-1,3-dithiol, 3,4-dimethoxybutane-1,2-dithiol, 2-methylcyclohexan-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate) and 1,2-bis(2-mercaptoethylthio)-3-mercaptopropane.

(ii) Aromatic thiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene-dimethanethiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane.

(iii) Halogen substituted aromatic thiols, including chlorine-substituted and bromine-substituted compounds, such as 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene.

(iv) Aromatic thiols containing sulfur as well as mercapto groups, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene and 1,2,4,5-tetrakis(mercaptoethylthio)benzene, and nucleus alkylated compounds of these.

(v) Aliphatic thiols containing sulfur as well as mercapto groups such as bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide and bis(mercaptopropyl)disulfide, and their esters of thioglycolic acid and mercaptopropionic acid; hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(2-mercaptoacetate), 1,4-dithian-2,5-diol bis(3-mercaptopropionate), thioglycolic acid bis(2-mercaptoethyl ester), thiodipropionic acid bis(2-mercaptoethyl ester), 4,4'-thiodibutylic acid bis(2-mercaptoethyl ester), dithiodiglycolic acid bis(2-mercaptoethyl ester), dithiodipropionic acid bis(2-mercaptoethyl ester), 4,4'-dithiodibutylic acid bis(2-mercaptoethyl ester), thioglycolic acid bis(2,3-dimercaptopropyl ester), thiodipropionic acid bis(2,3-dimercaptopropyl ester), dithiodiglycolic acid bis(2,3-dimercaptopropyl ester), dithiodipropionic acid (2,3-dimercaptopropyl ester), 4-mercaptomethyl-3,6-dithiaoctane-1,8-dithiol, bis(mercaptomethyl)-3,6,9-trithia-1,11-undecanedithiol and bis(1,3-dimercapto-2-propyl) sulfide.

(vi) Heterocyclic compounds containing sulfur as well as mercapto groups such as 3,4-thiophenedithiol, tetrahydrothiophene-2,5-dimercaptomethyl, 2,5-dimercapto-1,3,4-thiadiazole, 2,5-dimercapto-1,4-dithiane and 2,5-dimercaptomethyl-1,4-dithiane.

Examples of polyhydroxy compounds are described below.

(i) Aliphatic polyols such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl)isocyanurate, cyclobutanediol, cyclopentanediol, cyclohexanediol, cycloheptanediol, cyclooctanediol, bicyclo[4.3.0]-nonanediol, dicyclohexanediol, tricyclo[5.3.1.1]dodecanediol, spiro[3.4]octanediol and butylcyclohexanediol.

(ii) Aromatic polyols such as dihydroxynaphthalene, trihydroxynaphthalene, tetrahydroxynaphthalene, dihydroxybenzene, benzenetriol, trihydroxyphenanthrene, bisphenol A, bisphenol F, xylylene glycol and tetrabromobisphenol A.

(iii) Products of addition reactions of polyhydroxy compounds mentioned in the above (i) or (ii) with alkylene oxides such as ethylene oxide and propylene oxide.

(iv) Polyols containing sulfur such as bis[4-(hydroxyethoxy)phenyl]sulfide, bis-[4-(2-hydroxypropyl)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide and compounds produced by that an average of 3 molecules or less of ethylene oxide and/or propylene oxide per hydroxyl group is added to these compounds, di-(2-hydroxyethyl) sulfide, 1,2-bis-(2-hydroxyethylmercapto)ethane, bis(2-hydroxyethyl) disulfide, 1,4-dithian-2,5-diol, bis(2,3-dihydroxypropyl) sulfide, tetrakis(4-hydroxy-2-thiabutyl)methane, bis(4-hydroxyphenyl) sulfone (trade name: Bisphenol S), tetrabromobisphenol S, tetramethylbisphenol S, 4,4'-thiobis(6-tert-butyl-3-methylphenol) and 1,3-bis(2-hydroxyethylthioethyl)-cyclohexane.

Some of poly(thio)urethane resins are known to be used as lens base materials. Actual examples of known publications that disclose the resins include Japanese Patents Laid-open Nos. Sho 58-127914, Sho 57-136601, Hei 01-163012, Hei 03-236386, Hei 03-281312, Hei 04-159275, Hei 05-148340, Hei 06-065193, Hei 06-256459, Hei 06-313801, Hei 06-192250, Hei 07-063902, Hei 07-104101, Hei 07-118263, Hei 07-118390, Hei 07-316250, Sho 60-199016, Sho 60-217229, Sho 62-236818, Sho 62-255901, Sho 62-267316, Sho 63-130615, Sho 63-130614, Sho 63-046213, Sho 63-245421, Sho 63-265201, Hei 01-090167, Hei 01-090168, Hei 01-090169, Hei 01-090170, Hei 01-096208, Hei 01-152019, Hei 01-045611, Hei 01-213601, Hei 01-026622, Hei 01-054021, Hei 01-311118, Hei 01-295201, Hei 01-302202, Hei 02-153302, Hei 01-295202, Hei 02-802, Hei 02-036216, Hei 02-058517, Hei 02-167330, Hei 02-270859, Hei 03-84031, Hei 03-084021, Hei 03-124722, Hei 04-78801, Hei 04-117353, Hei 04-117354, Hei 04-256558, Hei 05-78441, Hei 05-273401, Hei 05-093801, Hei 05-080201, Hei 05-297201, Hei 05-320301, Hei 05-208950, Hei 06-072989, Hei 06-256342, Hei 06-122748, Hei 07-165859, Hei 07-118357, Hei 07-242722, Hei 07-247335, Hei 07-252341, Hei 08-73732, Hei 08-092345, Hei 07-228659, Hei 08-3267, Hei 07-252207, Hei 07-324118 and Hei 09-208651. It goes without saying that the polyisocyanate compounds, polythiol compounds and polyhydroxy compounds that are disclosed in the aforementioned patents are starting material monomers for producing poly(thio)urethane resins of the present invention.

Examples of resins containing diethylene glycol bisallylcarbonate as a main component include homopolymers of diethylene glycol bisallylcarbonate, and copolymers of diethylene glycol bisallylcarbonate and monomers that are polymerizable with the carbonate.

Examples of monomers that are polymerizable with diethylene glycol bisallylcarbonate include monofunctional methacrylates such as methyl methacrylate, ethyl methacrylate, n-butyl methacrylate, ethylhexyl methacrylate, benzyl methacrylate, phenyl methacrylate, cyclohexyl methacrylate, isobornyl methacrylate and adamantyl methacrylate. Examples of multifunctional methacrylates include ethylene glycol dimethacrylate, diethylene glycol dimethacrylate, triethylene glycol dimethacrylate, tripropylene glycol dimethacrylate, 1,4-butanediol dimethacrylate, 1,6-hexanediol dimethacrylate, trimethylolpropane trimethacrylate, pentaerythritol trimethacrylate, glycerin dimethacrylate, 2,2-bis[4-(methacryloxy)phenyl]propane and 2,2-bis[4-(methacryloxyethoxy)phenyl]propane. Besides, are also exemplified acrylates such as methyl acrylate, ethyl acrylate, n-butyl acrylate, ethylhexyl acrylate, cyclohexyl acrylate, benzyl acrylate, phenyl acrylate, isobornyl acrylate, ethylene glycol diacrylate, triethylene glycol diacrylate, 1,6-hexanediol diacrylate, trimethylolpropane triacrylate, pentaerythritol triacrylate, 2,2-bis[4-(acryloxy)phenyl]propane and 2,2-bis[4-(acryloxyethoxy)phenyl]propane; nucleus-substituted styrenes and α-methylstyrenes such as styrene, methylstyrene, dimethylstyrene, chlorostyrene, dichlorostyrene, bromostyrene, p-chloromethylstyrene and divinyl benzene; acrylonitrile, methacrylonitrile, maleic anhydride, N-substituted maleimide, diallylphthalate, diallyisophthalate and diallylterephthalate.

Copolymers of diethylene glycol bisallylcarbonate with other monomers are known. Their examples are those disclosed in Japanese Patents Laid-open Nos. Sho 54-41965 and Sho 51-125487, and Kohyo (Jpn. Unexamined Patent Publication) No. Hei 01-503809.

The resin obtained from a compound containing epithio groups refers to a resin produced by polymerizing a monomer having the epithio groups or a monomer mixture containing the monomer. Actual examples of the monomer containing the epithio groups are described in the following.

(i) Episulfide compounds having alicyclic skeletons such as 1,3- and 1,4-bis(β-epithiopropylthio)cyclohexane, 1,3- and 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane and bis[4-(β-epithiopropylthio)cyclohexyl]sulfide.

(ii) Episulfide compounds having aromatic skeletons such as 1,3- and 1,4-bis(β-epithiopropylthio)benzene, 1,3- and 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfine and 4,4-bis(β-epithiopropylthio)biphenyl.

(iii) Episulfide compounds having dithiane ring skeletons such as 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane and 2,3,5-tri(β-epithiopropylthioethyl)-1,4-dithiane.

(iv) Epithio compounds having aliphatic skeletons such as 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)metane, 1,1,1-tris(β-epithiopropylthiomethyl)propane and bis-(β-epithiopropyl) sulfide.

Some of resins obtained from compounds having epithio groups are known to be used as base materials for plastic lenses. Their examples include those disclosed in Japanese Patents Laid-open Nos. Hei 09-071580, Hei 09-110979, Hei 09-255781, Hei 03-081320, Hei 11-140070, Hei 11-183702, Hei 11-189592 and Hei 11-180977, and Kohyo (Jpn. Unexamined Patent Publication) No. Hei 01-810575.

Other examples are radically polymerized polymers having (thio)urethane structures in the molecules. Their actual examples include polymers produced by radial polymerization of a monomer that is prepared by a reaction of a straight-chain alkane compound having 3 to 6 carbons and at least two mercapto groups in the molecule with a compound having at least an isocyanate group and at least a (meth)acryloyl group in the molecule. The (meth)acryloyl group refers to both of acryloyl group and methacryloyl group.

Examples of the straight-chain alkane compound having 3 to 6 carbons and at least 2 mercapto groups in the molecule, one of the starting materials of the radically polymerizable compound having thiourethane bonds mentioned above, include 1,2,3-trimercaptopropane, 1,2,3-trimercaptobutane, 1,2,4-trimercaptobutane, 1,2,3,4-tetramercaptobutane, 1,2,3-trimercaptopentane, 1,2,4-trimercaptopentane, 1,2,3,4-tetramercaptopentane, 1,2,3-trimercaptohexane, 1,2,4-trimercaptohexane, 1,2,5-trimercaptohexane, 2,3,4-trimercaptohexane, 2,3,5-trimercaptohexane, 3,4,5-trimercaptohexane, 1,2,3,4-tetramercaptohexane, 1,2,3,5-tetramercaptohexane, 1,2,4,5-tetramercaptohexane, 2,3,4,5-tetramercaptohexane and 1,2,3,4,5-pentamercaptohexane. Of them, 1,2,3-trimercaptopropane is preferred particularly from the viewpoint of the performance of optical materials obtained and easy availability.

Examples of the compound having at least an isocyanate group and at least a (meth)acryloyl group in the molecule, another starting material, include acryloyl isocyanate, methacryloyl isocyanate, 2-isocyanate ethyl acrylate, 2-isocyanate ethyl methacrylate, 2-isocyanate propyl acrylate and 2-isocyanate propyl methacrylate. Of them, 2-isocyanate ethyl methacrylate is favored particularly in terms of the performance of optical materials obtained and easy availability. Those exemplified in the above are compounds having an isocyanate group and a (meth)acryloyl group. Compounds having two or more isocyanate groups or two or more (meth)acryloyl groups can also be used.

When the said organic-inorganic composite mentioned above is used as an optical material, in order to improve the physical properties of the material as required, for example, in the case of use of a radically polymerizable organic monomer, one or more radically polymerizable compounds that have radically polymerizable groups and are co-polymerizable with the said compounds may be contained in addition to the said polymerizable compounds. Actual examples of the radically polymerizable compounds include methyl (meth)acrylate, ethyl (meth)acrylate, propyl (meth)acrylate, butyl (meth)acrylate, 2-ethylhexyl (meth)acrylate, benzyl (meth)acrylate, butoxyethyl (meth)acrylate, cyclohexyl (meth)acrylate, 2-hydroxyethyl (meth)acrylate, glycidyl (meth)acrylate, phenoxyethyl (meth)acrylate, ethylene glycol di(meth)acrylate, diethylene glycol di(meth)acrylate, triethylene glycol di(meth)acrylate, tetraethylene diglycol di(meth)acrylate, polyethylene glycol di(meth)acrylate, neopentyl glycol di(meth)acrylate, ethylene glycol bisglycidyl (meth)acrylate, bisphenol A di(meth)acrylate, 2,2-bis(4-(meth)acryloxydiethoxyphenyl)propane, trimethylolpropane tri(meth)acrylate, glycelol di(meth)acrylate, diallylphthalate, diallylterephthalate, diallylisophthalate, diallylcarbonate, diethylene glycol bisallylcarbonate, styrene, chlorostyrene, methylstyrene, bromostyrene, dibromostyrene, 2,5-bis(2-thia-3-butenyl)-1,4-dithiane and 2,5-bis((meth)acryloylthiomethyl)-1,4-dithiane. Particularly preferred is 2,5-bis(2-thia-3-butenyl)-1,4-dithiane. The said (meth)acrylate refers to both of acrylate and methacrylate, and the (meth)acryloxy group to both of acryloxy group and methacryloxy group.

For a polymerization reaction, a known radical or cationic polymerization initiator is added in case the organic monomer is an organic monomer that is capable of radical or cationic polymerization. In case the organic monomer is an organic monomer capable of carrying out polyaddition or polycondensation, an amine or organic metal compound is added for polymerization. Examples of the amine compound include triethylenediamine, hexamethylenetetramine, N,N-dimethyloctylamine, N,N,N',N'-tetramethyl-1,6-diaminohexane, 4,4'-trimethylene bis(1-methylpiperidine) and 1,8-diazabicyclo-[5.4.0]-7-undecene, and examples of the organic metal compound include dimethyltin dichloride, dimethyltin bis(isooctylthioglycolate), dibutyltin dichloride, dibutyltin dilaurate, dibutyltin maleate, dibutyltin maleate polymers, dibutyltin diricinolate, dibutyltin bis(dodecylmercaptide), dibutyltin bis(isooctylthioglycolate), dioctyltin dichloride, dioctyltin maleate, dioctyltin maleate polymers, dioctyltin bis(butylmaleate), dioctyltin dilaurate, dioctyltin diricinolate, dioctyltin dioleate, dioctyltin di(6-hydroxy)caproate, dioctyltin bis(isooctylthioglycolate), didodecyltin diricinolate, copper oleate, copper acetylacetonate, iron acetylacetonate, iron naphthenate, iron lactate, iron citrate, iron gluconate, potassium octanate and 2-ethylhexyl titanate. Among the said catalysts for the polyaddition or polycondensation reactions, dibutyltin dichloride and dibutyltin dilaurate are particularly preferred. These catalysts can be used alone or a combination of two or more.

In the case of radical photopolymerization, a known sensitizer, such as benzophenone, 4,4-diethylaminobenzophenone, 1-hydroxycyclohexylphenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropane-1-one or acylphosphine oxide, may be added to improve reactivity.

The said polymerization reaction can be carried out by either solution or bulk polymerization. A mixture of organic and inorganic components is polymerized by heating or light irradiation.

Examples of processes for the preparation of organic-inorganic composites are described in the following:

(1) A dispersed ingredient having metal-oxygen bonds that is prepared from an organic polymer, a metal alkoxide or the like is mixed in an organic solvent or in bulk, and the resulting product is molded.

(2) A dispersed ingredient having metal-oxygen bonds is prepared from a metal alkoxide or the like in an organic solvent, an organic monomer is added, solution or bulk polymerization is carried out, and the resulting product is molded.

(3) A metal alkoxide or the like is mixed with an organic monomer in an organic solvent, water is added to hydrolyze them to give a mixture of the organic monomer and a dispersed ingredient having metal-oxygen bonds, followed by solution or bulk polymerization, and the resulting product is molded.

(4) An organic monomer is mixed with a metal alkoxide or the like in an organic solvent, water is added to hydrolyze them, and the resulting product is molded.

(5) A dispersed ingredient having metal-oxygen bonds that is prepared from a metal alkoxide or the like and dissolved in an organic solvent, to which an organic solvent containing an organic polymer is dropped and mixed, and the mixture is used for molding.

Method (2) or (3) is particularly preferred. In Method (3), in the case of use of a polycondensation product as an organic polymer, a monomer, if unstable in water, is favorably added after a dispersed ingredient having metal-oxygen bonds is prepared.

A favored application of the organic-inorganic composite of the present invention is for an optical material thanks to its high refractive index and high transmittance of visible rays. To the optical material, if necessary, a UV absorber, coloring matter, pigment or the like is added to improve light absorption characteristics; an antioxidant, coloring inhibitor or the like to improve weather resistance; and a mold releasing agent or the like to improve moldability, at discretion. Examples of the UV absorber include benzotriazoles, benzophenones and salicylic acid compounds. As for the coloring matter and pigment, anthraquinone and azo compounds are exemplified. Examples of the antioxidant and coloring inhibitor include monophenol compounds, bisphenol compounds, polymer-type phenol compounds, sulfur compounds and phosphorus compounds. Examples of the mold releasing agent include fluorine surface active agents, silicone surface active agents, acidic phosphates and higher fatty acids.

In the processes for the preparation of the optical materials of the present invention, for example, in case a monomer used is radically polymerizable, a homogeneous mixture containing the said dispersed ingredient having metal-oxygen bonds, the aforementioned organic monomer, a monomer copolymerizable with the monomer, and additives and a catalyst is treated according to a known casting polymerization process, that is, the mixture is cast in a mold made of a glass or plastic mold that transmits UV rays through and a plastic gasket, and UV rays are irradiated to harden the mixture. When a monomer capable of polyaddition or polycondensation is used, the mixture is heated to harden. When doing so, a mold may be treated with a releasing agent beforehand or a mold releasing agent may be added to the homogeneous mixture solution, in order to make it easy to take out the resin after molded. Furthermore, it is preferable to heat after the UV irradiation in order to complete the polymerization or to alleviate the stress generated inside the materials. A temperature and duration of time of the heating depend on an amount of UV irradiation energy and other conditions. They are generally 30 to 150° C. and 0.2 to 24 hours, respectively. In the case of the casting polymerization by heating, for example, the initial temperature is favorably in a relatively low temperature range of 5 to 40° C., and it is preferable to raise the temperature gradually over 10 to 70 hours to a high temperature of 100 to 130° C. As for an optical material obtained according to a process of the said (1) or (4) in which the organic polymer is already produced, a solution can be cast in a mold for molding. The optical material of the present invention, obtained as described above, usually has a refractive index of 1.60 or above. The optical material of the present invention is easily dyed with a general dispersing dye in water or an organic solvent. In doing so, a carrier may be added or the material be heated to make dyeing easier.

It is also an object of the present invention to provide an optical product consisting of the optical material thus obtained. Any optical product can be produced and is exemplified by optical plastic lenses such as lenses for spectacles, prisms, optical fibers, base plates for recording media, filters as well as glass and flower vases. Among them, the material is favorably used for optical plastic lenses, particularly for lenses for spectacles.

An optical material of the present invention can be coated over the surface of a lens, glass or the like, without carrying out casting polymerization, and hardened by an operation such as light irradiation, if required. In this way the material can also be used as a starting material to make a hard coat film to protect the surface and for a multi-layered reflection preventive film to prevent reflection. Any coating method, including dip coating, spin coating, flow coating, roller coating and brush coating, can be adopted.

BEST FORM TO IMPLEMENT INVENTION

Figure 1:
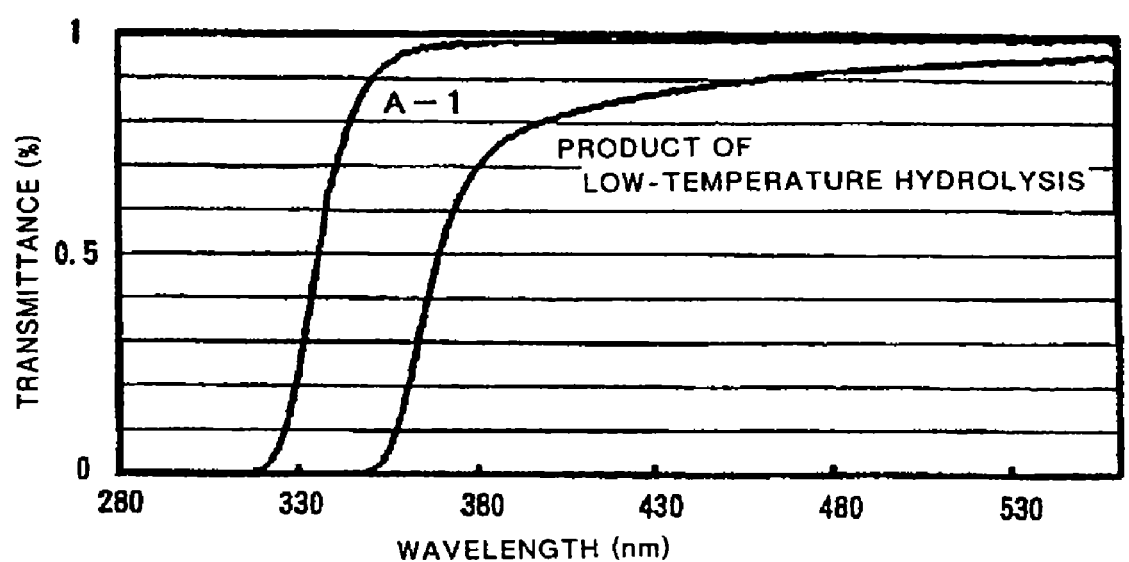
FIG. 1 shows a UV characteristic of the product of titanium alkoxide hydrolyzed at a low temperature in Example 1.

The present invention is described in more detail in reference to the following examples, but the scope of the invention is not limited to the examples.

Example 1

In a four neck flask was dissolved 7.87 g (27.7 mmol) of titanium tetraisopropoxide (A-1; produced by Nippon Soda Co., Ltd.; purity: 99.9%, a concentration of 28% by weight in terms of titanium oxide) in tetrahydrofuran, and replaced with nitrogen gas. The solution was cooled in a bath of methanol with dry ice added (about $-74°$ C.) for about 20 minutes, and distilled water diluted with tetrahydrofuran (0.8 g: 44.4 mmol of distilled water) was added with stirring. The total weight of tetrahydrofuran was 32.12 g. The amount of water added at the time was at a molar ratio of $H_2O/Ti=1.6$. Then, temperature was gradually raised to room temperature to give a tetrahydrofuran solution containing a light yellow, transparent hydrolysate of titanium isopropoxide. The appearance of the tetrahydrofuran solution obtained is shown in Table 1. The solution had 87% of visible ray transmittance (550 nm). The UV characteristic of the solution prepared as described above is shown in FIG. 1. FIG. 1 also shows the UV characteristic of titanium tetraisopropoxide. A comparison of the two reveals that the hydrolysate produced at a low temperature had better UV protection than titanium tetraisopropoxide did, so as to show the growth of Ti—O—Ti bonds.

Comparative Example 1

Example 1 was repeated except that 11.0 g (55.6 mmol) of distilled water was added.

The appearance of the tetrahydrofuran solution produced is shown in Table 1.

Comparative Example 2

Example 1 was repeated except that 1.2 g (66.7 mmol) of distilled water was added.

The appearance of the tetrahydrofuran solution produced is shown in Table 1.

Example 2

The tetrahydrofuran solution obtained Example 1 was concentrated by a rotary evaporator under reduced pressure in a bath of 50° C. to give a light yellow, transparent, viscous liquid of a concentration of 40.2% by weight in terms of titanium oxide. The liquid dissolved again when a tetrahydrofuran solvent was added to it.

TABLE 1

| | Distilled Water/Ti(i-OC$_3$H$_7$)$_4$ (mol ratio) | Concentration in terms of TiO$_2$ (%) | Appearance at $-74°$ C. | Appearance at room temp. |
|---|---|---|---|---|
| Example 1 | 1.6 | 5.4 | Light yellow, transparent | Light yellow, transparent |
| Example 2 | 1.6 | 40.2 | — | Light yellow, transparent |
| Comparative Example 1 | 2.0 | 5.4 | Light yellow, transparent | Cloudy, gel |
| Comparative Example 2 | 2.4 | 5.4 | Light yellow, transparent | Cloudy, gel |

Example 3

12.4 g of titanium tetraisopropoxide (A-1; produced by Nippon Soda Co., Ltd., purity: 99%, a concentration of 28.2% by weight in terms of titanium oxide) was dissolved in 45.0 g of toluene in a four neck flask, replaced with nitrogen gas, and cooled to $-80°$ C. in an ethanol/liquid nitrogen bath. Separately, 1.26 g ($H_2O/Ti=1.6$ molar ratio) of ion-exchanged water was mixed with 11.3 g of isopropanol, cooled to $-80$ to $-70°$ C., and, keeping this condition, dropped in the four neck flask with stirring for hydrolysis. While dropping, the liquid temperature in the flask was kept to $-80$ to $-70°$ C. Upon the completion of the dropping, the reaction solution was stirred for 30 minutes while cooling, and then warmed up to room temperature with stirring to give a colorless, transparent sol of a concentration of 5% by weight in terms of titanium oxide. The solution had 85% of visible ray transmittance (550 nm).

Example 4

The solution obtained in Example 3 was concentrated by a rotary evaporator in a bath of 50° C. to give a viscous liquid of a concentration of 54.3% by weight in terms of titanium oxide. The liquid dissolved again when a toluene solvent was added to it.

Example 5

10.8 g of zirconium tetra-n-butoxide (TBZR; produced by Nippon Soda Co., Ltd., purity: 87%, a concentration of 32.2% by weight in terms of zirconium oxide) was dissolved in 46.9 g of a toluene solution in a four neck flask, replaced with nitrogen gas, and cooled to $-80°$ C. in an ethanol/liquid nitrogen bath. Separately, 0.812 g ($H_2O/Zr=1.6$ molar ratio) of ion-exchanged water was mixed with 7.30 g of 2-butanol, cooled to $-80$ to $-70°$ C., and, keeping this condition, dropped in the four neck flask with stirring for hydrolysis. While dropping, the liquid temperature in the flask was kept to −80 to −70° C. Upon the completion of the dropping, the reaction solution was stirred for 30 minutes while cooling, and then warmed up to room temperature with stirring to give a colorless, transparent sol of a concentration of 5% by weight in terms of zirconium oxide. The solution had 88% of visible ray transmittance (550 nm).

Example 6

The solution obtained in Example 5 was concentrated by a rotary evaporator in a bath of 50° C. to give a viscous liquid of a concentration of 43% by weight in terms of zirconium oxide. The liquid dissolved again when a toluene solvent was added to it.

Example 7

9.12 g of tantalum pentaethoxide (produced by Kojundo Kagaku Kenkyujo Co., Ltd., purity: 99%, a concentration of 54.4% by weight in terms of tantalum oxide) was dissolved in a mixed solution of 42.1 g of toluene and 42.1 g of ethanol in a four neck flask, replaced with nitrogen gas, and cooled to −80° C. in an ethanol/liquid nitrogen bath. Separately, 0.652 g ($H_2O$/Ta=1.6 molar ratio) of ion-exchanged water was mixed with a mixed solvent of 2.96 g of toluene and 2.96 g of ethanol, cooled to −80 to −70° C., and, keeping this condition, dropped in the four neck flask with stirring for hydrolysis. While dropping, the liquid temperature in the flask was kept to −80 to −70° C. Upon the completion of the dropping, the reaction solution was stirred for 30 minutes while cooling, and then warmed up to room temperature with stirring to give a colorless, transparent sol of a concentration of 5% by weight in terms of tantalum oxide. The solution had 88% of visible ray transmittance (550 nm).

Example 8

The solution obtained in Example 7 was concentrated by a rotary evaporator in a bath of 50° C. to give a viscous liquid of a concentration of 64.5% by weight in terms of tantalum oxide. The liquid dissolved again when a toluene solvent was added to it.

Example 9

5.00 g of indium triisopropoxide (produced by Kojundo Kagaku Kenkyujo Co., Ltd., purity: 99%, a concentration of 47.4% by weight in terms of indium oxide) and 0.79 g of an adduct of tin tetraisopropoxide and isopropanol (produced by Azumax Co., Ltd., purity: 99%, a concentration of 42.6% by weight in terms of tin dioxide) were dissolved in 44.5 g of a toluene solution in a four neck flask, replaced with nitrogen gas, and cooled to −80° C. in an ethanol/liquid nitrogen bath. Separately, 0.370 g ($H_2O$/(In+Sn)=1.08 molar ratio) of ion-exchanged water was mixed with 3.33 g of isopropanol, cooled to −80 to −70° C., and, keeping this condition, dropped in the four neck flask with stirring for hydrolysis. While dropping, the liquid temperature in the flask was kept to −80 to −70° C. Upon the completion of the dropping, the reaction solution was stirred for 30 minutes while cooling, and then warmed up to room temperature with stirring to give a yellow, transparent mixed sol of indium oxide and tin oxide of a concentration of 5% by weight in terms of metal oxides ($In_2O_3$ and $SnO_2$). The solution had 75% of visible ray transmittance (550 nm).

Example 10

The solution obtained in Example 9 was concentrated by a rotary evaporator in a bath of 50° C. to give a concentrate of a concentration of 70% by weight in terms of the metal oxides. The concentrate dissolved again when a toluene solvent was added to it.

Example 11

66.84 g of partially hydrolyzed titanium tetraisopropoxide (A-10; produced by Nippon Soda Co., Ltd.) was dissolved in 402.74 g of toluene in a four neck flask, replaced with nitrogen gas and cooled to −80° C. in an ethanol/liquid nitrogen bath. Separately, 3.38 g of ion-exchanged water was mixed with 30.42 g of isopropanol, cooled to −80 to −70° C., and, keeping this condition, dropped in the four neck flask with stirring for hydrolysis. While dropping, the liquid temperature in the flask was kept to −80 to −70° C. Upon the completion of the dropping, the reaction solution was stirred for 30 minutes while cooling, and then warmed up to room temperature with stirring to give a colorless, transparent sol of a concentration of 5% by weight in terms of titanium oxide. The solution had 92% of visible ray transmittance (550 nm).

Example 12

The solution obtained in Example 11 was concentrated by a rotary evaporator in a bath of 50° C. to give a viscous liquid of a concentration of 52.3% by weight in terms of titanium oxide. The liquid dissolved again when a toluene solvent was added to it.

Example 13

3.0 g of a tetrahydrofuran solution containing the titanium isopropoxide hydrolysate prepared in Example 1 was cooled in a bath of methanol with dry ice added (about −74° C.), and dropped to mix, with stirring, into a tetrahydrofuran solution containing 4.2 g of 2,5-bismercapto-1,4-dithiane (BMMD) and 4.6 g of 2,5-(bisisocyanate methyl)-1,4-dithiane (BIMD). Upon the completion of the mixing, the solution was gradually warmed up to room temperature. 0.06 g of dibutyltin dilaurate (produced by Nakarai Tesk Co., Ltd) was added to the solution to stir. After that, the solvent was distilled off, followed by defoaming. The resulting product was cast into a glass mold and the mold was closed up tightly. Then, a polymerization reaction was carried out by heating for 24 hours while gradually raising the temperature from room temperature to 120° C. Then, the mold was cooled down to room temperature. The molded was taken out from the mold to give a transparent massive product. The massive product obtained was measured for a refractive index by an Abbe refractometer. The refractive index is shown in Table 2.

Example 14

Example 13 was repeated except that 1.5 g of a tetrahydrofuran solution containing the titanium isopropoxide hydrolysate prepared in Example 1 was used. The result is also shown in Table 2.

Comparative Example 3

Example 13 was repeated except that the tetrahydrofuran solution containing the titanium isopropoxide hydrolysate was not used. The refractive index of the massive product obtained is shown in Table 2.

TABLE 2

| | Hydrolysate solution (g) | BMMD (g) | BIMD (g) | Refractive index |
|---|---|---|---|---|
| Example 13 | 3.0 | 4.2 | 4.6 | 1.656 |
| Example 14 | 1.5 | 4.2 | 4.6 | 1.640 |
| Comparative Example 3 | 0.0 | 4.2 | 4.6 | 1.633 |

Example 15

A tetrahydrofuran solution containing the titanium tetraisopropoxide hydrolysate prepared in Example 1 (total weight: 32.12 g) was again cooled in a bath of methanol with dry ice added, while keeping the solution replaced with nitrogen gas. Separately, 1.61 g of 2,5-bismercapto-1,4-dithiane (DMMD), 1.61 g of 2,5-(bisisocyanate methyl)-1,4-dithiane (BIMD) and 0.04 g of dibutyltin dilaurate were added to 8.03 g of tetrahydrofuran, and shaken with stirring in a warm bath of 60° C. for an hour to prepare a tetrahydrofuran solution containing a viscous polymer of DMMD and BIMD. This tetrahydrofuran solution containing the viscous polymer was dropped into the tetrahydrofuran solution containing the titanium tetraisopropoxide hydrolysate that was cooled previously, over 10 minutes. The resulting solution was stirred for 30 minutes while keeping cooling. The bath of methanol with dry ice added was removed and the solution was gradually warmed up to room temperature to give a light yellowish green, transparent tetrahydrofuran solution.

A silicone wafer of 30 mm×15 mm was dipped into the transparent solution, pulled up vertically at a rate of 0.1 mm/sec to form a transparent thin film on the silicone wafer. The thin film was measured for a reflection spectrum by FILMETRICS F Series, Model F20, made by Litho Tech Japan. The spectrum was overlapped on a simulation spectrum obtained by varying the optical constant, to measure the thickness and refractive index at 633 nm of the thin film. The measurement results are shown in Table 3.

Example 16

Example 15 was repeated to give a colorless, transparent solution, except that toluene was used, instead of tetrahydrofuran, to prepare a toluene solution containing titanium tetraisopropoxide hydrolysate according to the same method as that of Example 1.

This transparent solution was measured for film thickness and refractive index by the same technique as that used in Example 15. The results are shown in Table 3.

TABLE 3

| | Film thickness (nm) | Refractive index |
|---|---|---|
| Example 15 | 130 | 1.87 |
| Example 16 | 250 | 1.88 |

Example 17

Example 15 was repeated to give a transparent solution, except that isopropanol was used, instead of tetrahydrofuran, as a diluting agent of distilled water, to prepare a solution containing titanium tetraisopropoxide hydrolysate according to the same method as that of Example 1. The solution was 58.2 mole % in concentration in terms of titanium oxide.

This transparent solution was measured for film thickness and refractive index by the same method as that used in Example 15. The results showed the film was 134 nm thick and had refractive index of 1.87.

Example 18

A tetrahydrofuran solution prepared by the same method as that used in Example 1 was coated on a glass base plate by a bar coater (No. 5) to form a film and dried at 150° C. for 30 minutes to give a titanium oxide film of 0.1 μm thick. The contact angle of the film to water was 42°. The film was irradiated with near UV rays from a 15 W black light for an hour. The contact angle was reduced up to 120. It showed a good hydrophilic property. This is considered due to elimination of the remaining isopropoxy groups by the UV irradiation.

Example 19

The solution obtained in Example 11 was coated on a glass base plate by a bar coater (No. 5) to form a film and dried at 150° C. for 30 minutes to give a titanium oxide film of 0.1 μm thick. The contact angle of the film to water was 28°. The film was irradiated with near UV rays of 2 mW/cm$^2$ from a 15 W black light for an hour. The contact angle was reduced up to 3°. It showed a good hydrophilic property. An elementary analysis of the thin film by an XPS equipment (Quantum 2000) (manufactured by ULVAC PHI Co., Ltd.) showed a concentration of carbon element (refer to Equation 1) in the film after the UV irradiation was 5% or less.

$$\text{Carbon element concentration} = \frac{\text{Carbon element concentration} \times 100}{\text{Carbon element conc.} + \text{titanium element conc.} + \text{oxygen element conc.}} \quad \text{(Equation 1)}$$

Example 20

270 g of the solution obtained in Example 11 was mixed with 30 g of a solution of which an optical catalyst titania sol (TKS-251; produced by Teika Co., Ltd.) was diluted with toluene to make the solid matter 5% by weight. The obtained solution was coated to form a film each on a glass base plate and metal aluminum base board by dipping and dried at 100° C. to give a film of 0.3 μm thick on each of them.

To examine the photocatalytic activity of the films, salad oil was applied on each of the films so as to be about 0.1 mg/cm$^2$, and irradiated with UV rays at the intensity of 2 mW/cm$^2$ from a black light. The results are shown in Table 4. The salad oil was decomposed in a short time. Thus the films were proved to have high photocatalytic activity.

TABLE 4

| Sample | Base plate | Appearance | Adhesiveness | Salad oil decomposition (Note) |
|---|---|---|---|---|
| 20-1 | Glass | Transparent | Good | 70% |
| 20-2 | Metal aluminum | Transparent | Good | 80% |

(Note) BLB irradiation time: 72 hours.

Example 21

A toluene solution prepared by the same method as that used in Example 7 was coated by a bar coater (No. 5) on a glass base plate that was already coated with a gold electrode, to form a film and dried at 150° C. for 30 minutes to give a tantalum oxide film of 0.1 μm thick. A gold electrode was attached on the film by spattering, and the film was measured for permittivity. It was 18.

Example 22

To the solution obtained in Example 9 was added ITO fine particles (produced by Sumitomo Kinzoku Co., Ltd.) of 5% by weight in terms of ITO. The resulting solution was coated by a bar coater (No. 7) on a PET base plate to form a film, and dried at 120° C. for 30 minutes to give a film of 0.2 μm thick. The film was irradiated with UV rays from a high-pressure mercury lamp for 10 minutes. The surface resistance of the film was 350Ω/□.

Examples 23 to 28

An acrylic silicone resin (GEMLAC YC 3918, produced by Kanegafuchi Kagaku Co., Ltd.) was mixed with a titania sol prepared in the same way as that of Example 3, each at a ratio shown in Table 5, to prepare a toluene solution containing 10% by weight of solid matter (total of the weight of the solid of the resin and the weight of titania in terms of titanium oxide). Each of the solutions obtained was coated on a base plate of different type by a bar coater (No. 12) to give a hybrid film. The characteristics of the obtained films are shown together in Table 5. All of the obtained were transparent hybrid films.

Comparative Example 4

Example 19 was repeated to form a film, except that titanium tetraisopropoxide was used as titanium oxide. The results are also shown in Table 5. The film became cloudy. A transparent film was not produced.

TABLE 5

|  | Base plate | Resin solid weight/weight in terms of TiO$_2$ | Appearance | Adhesiveness |
| --- | --- | --- | --- | --- |
| Example 23 | Glass | 80/20 | Transparent | Good |
| Example 24 | Glass | 50/50 | Transparent | Good |
| Example 25 | Glass | 30/70 | Transparent | Good |
| Example 26 | PET | 80/20 | Transparent | Good |
| Example 27 | PET | 50/50 | Transparent | Good |
| Example 28 | PET | 30/70 | Transparent | Good |
| Comparative Example 4 | Glass | 50/50 | Cloudy | Peeled off |

APPLICABILITY IN INDUSTRY

As described above, a homogeneous, transparent organic-inorganic composite and a thin metal oxide film can be produced when a dispersed ingredient having metal-oxygen bonds, a type of metal oxide sol, of the present invention is used. Such substances can be widely used as optical materials and for other applications. Thus, the present invention is very valuable for applications in industry.

The invention claimed is:

1. A process for preparing a dispersed ingredient having metal-oxygen bonds that is stably dispersed in an organic solvent without aggregating, the dispersed ingredient having a transmittance of 80-100%, the transmittance being measured under conditions in which a concentration of the dispersed ingredient is 0.5% by weight in terms of oxide, an optical path length of a quartz cell is 1 cm, a control sample is the organic solvent, and a light wavelength is 550 nm, the process comprising:

hydrolyzing a metal alkoxide with water in the organic solvent without the addition of acids, bases and dispersion stabilizers;

wherein the metal alkoxide is hydrolyzed with 1.0 to less than 2.0 mol of water per mol of the metal alkoxide at a temperature from −50° C. to −100° C.

2. A process according to claim 1, wherein a weight-concentration in terms of metal oxide of the ingredient in the solution containing the dispersed ingredient having metal-oxygen bonds is 1.2 times or higher than that of the metal alkoxide before the hydrolysis.

3. A process according to claim 2, wherein the weight-concentration is 1.4 times or higher than that of the metal alkoxide before the hydrolysis.

4. A process according to claim 1, wherein the metal is one or more metals selected from the group consisting of titanium, zirconium, aluminum, silicon, germanium, indium, tin, tantalum, zinc, tungsten and lead.

5. A process according to claim 2, wherein the metal is one or more metals selected from the group consisting of titanium, zirconium, aluminum, silicon, germanium, indium, tin, tantalum, zinc, tungsten and lead.

6. A process according to claim 3, in which the metal is one or more metals selected from the group consisting of titanium, zirconium, aluminum, silicon, germanium, indium, tin, tantalum, zinc, tungsten and lead.

* * * * *